US011603657B1

(12) United States Patent
Tesh

(10) Patent No.: US 11,603,657 B1
(45) Date of Patent: Mar. 14, 2023

(54) DUAL FUNCTION INSULATION AND PEST BARRIER

(71) Applicant: William A. Tesh, Summerfield, NC (US)

(72) Inventor: William A. Tesh, Summerfield, NC (US)

(*) Notice: Subject to any disclaimer, the term of this patent is extended or adjusted under 35 U.S.C. 154(b) by 0 days.

(21) Appl. No.: 17/154,700

(22) Filed: Jan. 21, 2021

(51) Int. Cl.
*E04B 1/72* (2006.01)
*E04B 1/80* (2006.01)
*A01M 29/30* (2011.01)

(52) U.S. Cl.
CPC ............ *E04B 1/72* (2013.01); *A01M 29/30* (2013.01); *E04B 1/80* (2013.01)

(58) Field of Classification Search
CPC .. E04B 1/72; E04B 1/80; A01M 29/30; E04C 2/292; E04C 2/284; E04C 2/205
See application file for complete search history.

(56) References Cited

U.S. PATENT DOCUMENTS

| 4,631,077 | A * | 12/1986 | Spicer | B01D 46/2411 55/DIG. 13 |
| 7,585,559 | B2 * | 9/2009 | Schroeder | B32B 5/18 428/319.1 |
| 9,957,715 | B1 * | 5/2018 | Carlson | E04C 2/296 |
| 10,294,668 | B2 * | 5/2019 | Kreizinger | E04C 2/38 |
| 10,301,823 | B2 * | 5/2019 | Kreizinger | E04F 13/077 |
| 10,563,398 | B1 * | 2/2020 | Kreizinger | E04B 1/10 |
| 2011/0023410 | A1 * | 2/2011 | Hernandez Gallardo | E04C 2/044 52/800.1 |
| 2013/0260099 | A1 * | 10/2013 | Eisenkrein | E04F 13/045 428/163 |
| 2013/0305643 | A1 * | 11/2013 | Singleton | E04C 2/46 52/309.8 |
| 2015/0300026 | A1 * | 10/2015 | Eisenkrein | E04F 13/045 52/741.1 |
| 2016/0362846 | A1 * | 12/2016 | Boulesteix | E01B 21/02 |
| 2017/0232703 | A1 * | 8/2017 | Hawley | B29D 28/005 428/109 |
| 2018/0187417 | A1 * | 7/2018 | Kreizinger | B32B 3/08 |
| 2018/0202159 | A1 * | 7/2018 | Kreizinger | E04B 2/707 |

FOREIGN PATENT DOCUMENTS

GB 2198989 A * 6/1988 ............ B32B 27/065
WO WO-2014193244 A1 * 12/2014 ............... E06B 3/38

* cited by examiner

*Primary Examiner* — Theodore V Adamos
(74) *Attorney, Agent, or Firm* — Tuggle Duggins P.A.; Blake P. Hurt

(57) ABSTRACT

A dual function, foam-mesh insulator for deterring pests from entering a structure while also insulating the structure. Two pieces of polyethylene foam in the shape of a rectangle are laminated together with a correspondingly shaped portion of wire mesh positioned therebetween to form a unitary structure that can be deformably inserted into structure vent openings to prevent pests from accessing the same.

19 Claims, 5 Drawing Sheets

DUAL FUNCTION INSULATION AND PEST BARRIER

FIELD OF THE INVENTION

The disclosure herein pertains to pest prevention devices generally, and particularly pertains to a dual function, foam-mesh insulation for use as an environmentally-friendly apparatus and method of deterring pests from entering a structure such as a home or office.

DESCRIPTION OF THE PRIOR ART AND OBJECTIVES OF THE INVENTION

Structural insulation has been used for many years to increase comfort and energy efficiency for property owners. Insulation is generally considered the material used to reduce the loss or gain of heat in a structure by providing both a physical and thermal barrier between the is inside of the structure and the outside elements. With the difference in temperature on the outside of the structure, the structure can become very hot or very cold as dictated by the principles of thermodynamics without the use of an insulating material. Presently, the most common forms of insulation include fiberglass, cellulose, and spray foam. Although fiberglass, cellulose, and spray foam are common forms of insulation, none of these forms of insulation fully and thoroughly address pest concerns. In fact, all three of the most common forms of insulation are extremely vulnerable to pests and run a high risk of being damaged by pests. Spray foam and fiberglass insulation are ineffective as it can be gnawed on and destroyed, and cellulose is commonly eaten by pests as it is made of organic material. Simply put, insulation is not an effective pest barrier. With these ineffective methods of pest control, pests enter the structure and cause damage while also increasing the possibility of disease. Rodents, for example, have the ability to enter the structure by chewing through insulation and leaving feces and urine behind that can cause serious health hazards. Rodents are also known to carry disease, bacteria, viruses, and parasites which can be spread through droppings. Small particles from the bodily fluid of rodents and other pests are picked up in the air and may trigger allergies and cause illness.

Despite pests' ability to cause health hazards to humans, mankind has recently developed an aversion to harming pests through the use of traps or harmful chemicals. Attempts have been made to prevent the entry of pests through the use of boric acid and other compounds which attach to the pests and when ingested, kills the pest and its colony. Just as boric acid is only effective against self-grooming pests, insulation alone is not enough to keep a structure pest-free as described above. Insulation services often come with pest control plans which over time can become a costly addition to insulation, and by extension structure ownership. The most environmentally safe and cost efficient method of deterring pests is by blocking their entry points. Therefore there is a need for insulation that has the ability to block and prevent pests while also serving its purpose of keeping a comfortable environment inside of the structure. The need for a new form of insulation includes a cost efficient method of keeping pests under control. Though prior art devices have made attempts, none have addressed the need for both insulation and pest control.

Thus, in view of the problems and disadvantages associated with prior art devices, the present invention was conceived and one of its objectives is to provide an environmentally friendly device for deterring pests from entering a structure.

It is another objective of the present invention to provide a multifunctional device for insulating a structure while preventing rodent infestation.

It is still another objective of the present invention to provide a foam barrier including a substrate impenetrable to rodents.

It is yet another objective of the present invention to provide a metal barrier encased in an insulating material.

It is a further objective of the present invention to provide a foam and wire laminated product with two pieces of square foam with a portion of square grid wire evenly distributed there between.

It is still a further objective of the present invention to provide a foam mesh insulator formed from one or more pieces of a non-porous material, the one or more pieces of non-porous material carrying a metal member for preventing the entry of pests.

It is yet a further objective of the present invention to provide a pest barrier that is efficient to manufacture and simple to install.

It is still a further objective of the present invention to provide a method of using a foam and wire insulator to prevent the entry of pests into a structure.

Various other objectives and advantages of the present invention will become apparent to those skilled in the art as a more detailed description is set forth below.

SUMMARY OF THE INVENTION

The aforesaid and other objectives are realized by providing a dual-function foam-mesh insulator configured to deter pests from entering a structure, while offering an environmentally-friendly option for structure owners. Specifically, the foam-mesh insulator includes first and second pieces of foam formed out of a deformable material such as polyethylene which is durable and light weight, as well as being a non-porous material which prevents the entry of air and moisture. The first and second pieces of foam are preferably configured (i.e. sized and shaped) to define the shape of a rectangle or square having a one inch width. Evenly positioned between the first and second pieces of foam is a wire mesh including wire having a gauge (i.e. diameter) range between 19 gauge (0.91186 millimeter) and 22 gauge (0.64516 millimeter). The size of the wire, and the pattern it defines serves as a structural entry barrier to prevent the entry of small and large pests due to its resistance and (in most cases) inability to be chewed through. The wire mesh defines a wire body sized, shaped, and configured to be positioned entirely within the predetermined opening to prevent pests from accessing the structure by blocking passage of pests larger than the mesh openings. All three components, the first and second pieces of foam and the wire mesh, are preferably laminated into a single unit. Any reference to the "gauge" metric herein shall be understood to mean reference to the American Wire Gauge system, a commonly accepted standard used to denote wire size in North America.

DETAILED DESCRIPTION OF THE PREFERRED EMBODIMENT AND OPERATION OF THE INVENTION

Figure 1:
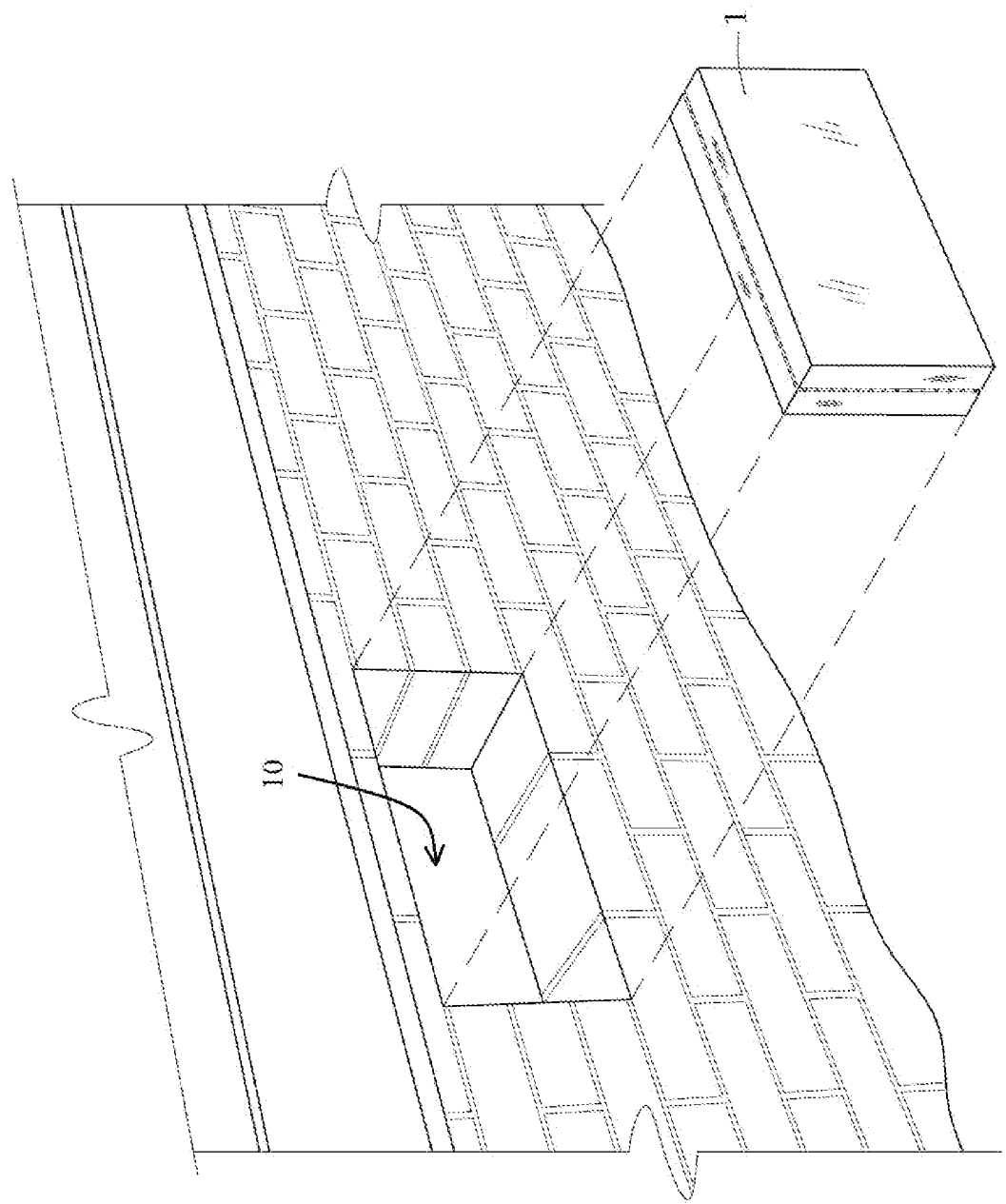
FIG. 1 shows a perspective view of the disclosed dual function insulation and pest barrier in its intended operating environment.
Figure 2:
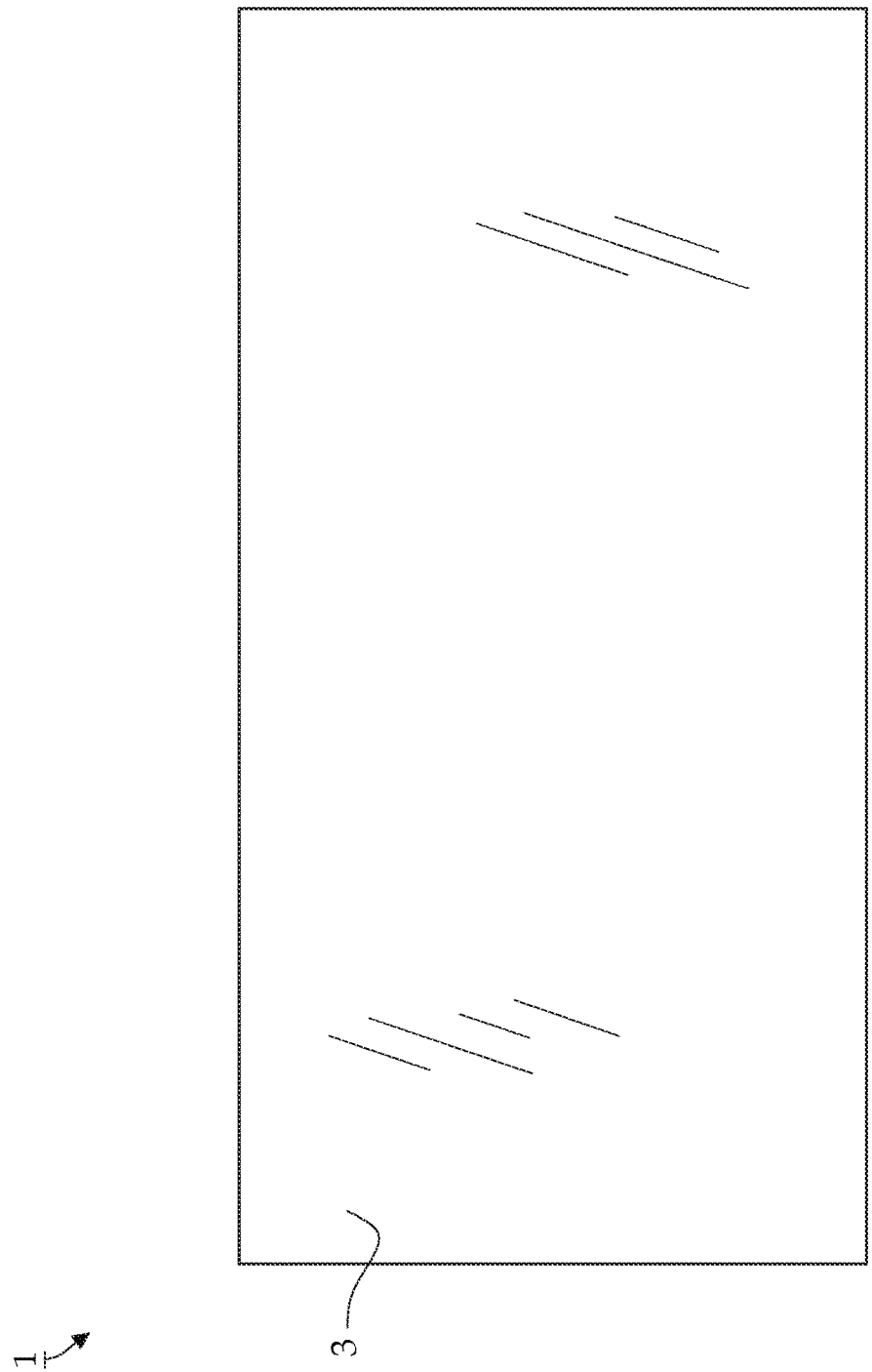
FIG. 2 pictures a top plan view of the dual function insulation and pest barrier of FIG. 1.
Figure 3:
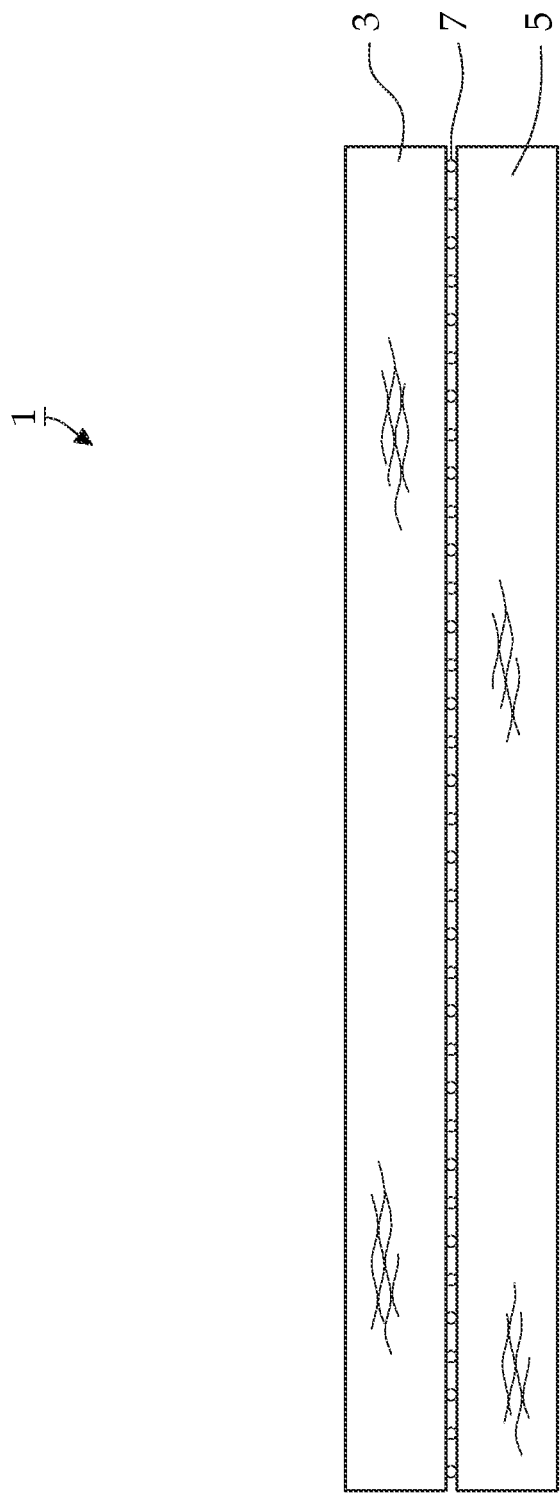
FIG. 3 depicts an elevated side view of the dual function insulation and pest barrier of FIG. 1, the opposite side defining a mirror view thereof.
Figure 4:
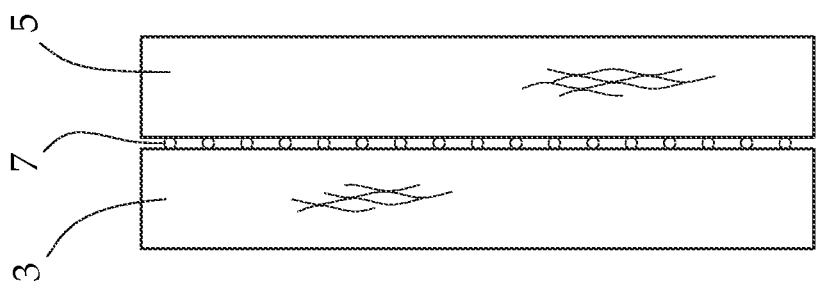
FIG. 4 demonstrates an elevated end view of the dual function insulation and pest barrier of FIG. 1, the opposite end defining a mirror view thereof.
Figure 5:
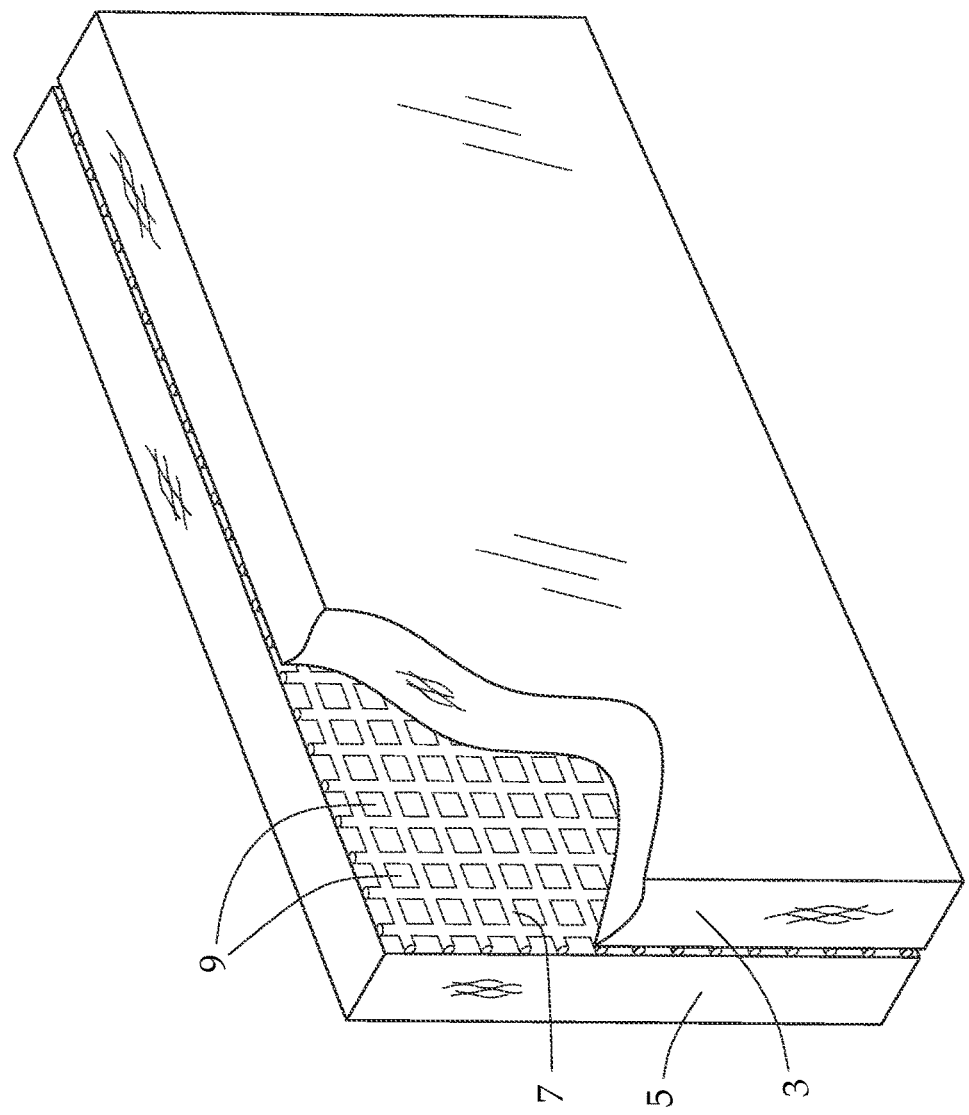
FIG. 5 illustrates a perspective view of the dual function insulation and pest barrier of Figure is 1 with a portion cut away to reveal the internal structure.

Various exemplary embodiments of the present disclosure are described below. Use of the term "exemplary" means illustrative or buy way of example only, and any reference herein to "the invention" is not intended to restrict or limit the invention to exact features or step of any one or more of the exemplary embodiments disclosed in the present specification. References to "exemplary embodiment", "one embodiment", "an embodiment", "various embodiments", and the like may indicate that the embodiment(s) of the invention so described may include a particular feature, structure, or characteristic, but not every embodiment necessarily incudes the particular feature, structure, or characteristic. Further, repeated use of the phrase "in one embodiment", "in an exemplary embodiment", or "in an alternative embodiment" do not necessarily refer to the same embodiment, although they may.

It is also noted that terms like "preferably", "commonly", and "typically" are not utilized herein to limit the scope of the invention or to imply that certain features are critical, essential, or even important to the structure or function of the invention. Rather, these terms are merely intended to highlight alternative or additional features that may or may not be utilized in a particular embodiment of the present invention.

The present invention is described more fully hereinafter with reference to the accompanying figures, in which one or more exemplary embodiments of the invention are shown. Like numbers used herein refer to like elements throughout. The invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limited as to the scope of the invention, and any and all equivalents thereof. Moreover, many embodiments such as adaptations, variations, modifications, and equivalent is arrangements will be implicitly disclosed by the embodiments described herein and fall within the scope of the instant invention.

Although specific terms are employed herein, they are used in a generic and descriptive sense only and not for the purposes of limitation. Unless otherwise expressly defined herein, such terms are intended to be given their broad, ordinary, and customary meaning not inconsistent with that applicable in the relevant industry ad without restriction to any specific embodiment hereinafter described. As used herein, the article "a" is intended to include one or more items. Where only one item is intended, the terms "one and only one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has previously been reduced to practice or that any testing has been performed. Likewise, unless stated otherwise, use of verbs in the past tense (present perfect or preterit) is not intended to indicate or imply that the invention has previously been reduced to practice or that any testing has been performed.

For a better understanding of the invention and its operation, turning now to the drawings, FIGS. 1-5 illustrate the preferred embodiment of a dual function, foam-mesh insulator 1 for deterring pests (not shown). Throughout the description and illustrations, foam-mesh insulator 1 is represented as a foam insulator member with wire mesh, but is not limited to any specific design and/or functionality, and intended use should not be construed as a limitation on the instant invention. In the preferred embodiment, foam mesh insulator 1 comprises a first portion of foam 3, a second portion of foam 5, and a section of wire mesh 7. As illustrated by at least FIGS. 1 and 5, all three components, the first piece of foam 3, second piece of foam 5, and wire mesh 7, are preferably laminated, layered, or otherwise combined into a single unit. Each foam piece 3, 5 defining a foam body is sized, shaped, and configured to deformably insert into a predetermined opening 10 of a structure to substantially plug the predetermined opening 10 via an interference fit. The wire mesh 7 including mesh openings 9 is carried by the first piece of foam 3, the 3. The wire mesh 7 defining a wire body is sized, shaped, and configured to be positioned entirely within the predetermined opening 10 to prevent pests from accessing the structure by blocking passage of pests larger than the mesh openings.

In the preferred embodiment, wire mesh 7 is defined as a substantially or completely metallic material formed from one or more metals and alloys, including iron, steel, brass, bronze, copper, aluminum, zinc, gold, silver, and platinum. However, the material defining wire mesh 7 is not intended as a limitation of the instant disclosure. Additionally, it is preferable but not required for wire mesh 7 to define a waffle pattern, most typically associated with chicken wire. In the alternative, the portion of wire mesh 7 may be of chain link design. A plurality of wires woven together to form the wire mesh 7 having one or more mesh openings 9 is carried by the first piece of foam 3. The wire mesh 7 defines a wire body sized, shaped, and configured to be positioned entirely within the predetermined opening 10 to prevent pests from accessing the structure by blocking passage of pests larger than the mesh openings 9. By way of example, but not as a limitation, one or more openings 9 of the portion of wire mesh 7 preferably define a size of four millimeters by four millimeters, however the specific size of one or more openings 9 may vary. The preferred embodiment of one or more openings 9 define a shape that is ideally square but may be of a hexagonal, round, ornamental, diamond, or slotted pattern to name a few non-limiting examples.

The plurality of wires woven together forming the wire mesh 7 having mesh openings 9 are carried by the first piece of foam 3. The wire mesh 7 defines a wire body sized, shaped, and configured to be positioned entirely in the predetermined opening 10 to prevent pests from accessing the structure by blocking passage of pests larger than the mesh openings 9. The lateral and longitudinal edges that combine to define the exterior periphery of wire mesh 7 may be described as having untrimmed, but balanced edges. By way of example, a balanced edge is one that defines the same approximate length extending in both the lateral and longitudinal direction. Similarly, by way of example, an untrimmed edge is one that is not otherwise considered blunted, and defines a pointed terminal end. Additionally, or in the alternative, the lateral and longitudinal edges that combine to define the exterior periphery of wire mesh 7 may include, but are not limited to trimmed, randomly untrimmed, balanced, unbalanced, woven, welded, or other known edge configuration(s). In the preferred embodiment, the diameter or thickness of the wire(s) that make up wire mesh 7 are defined as 22 gauge, 0.64516-millimeter wire. In yet another embodiment, the diameter or thickness of the wire(s) that make up wire mesh 7 are defined as 19 gauge, 0.91186-millimeter wire. While the diameter of the wire(s) used to form wire mesh 7 are not intended to be construed as a limitation on the instant disclosure, embodiments of wire considered within the scope of the instant disclosure preferably define a diameter between 22 gauge, 0.64516-millimeter and 19 gauge, 0.91186-millimeter wire.

In the preferred embodiment, the color of wire mesh 7 is silver. In the alternative, wire mesh 7 may define white, black, fluorescing colors or a combination of these, and/or other colors. Additionally, preferred wire mesh 7 includes a sufficient bending modulus to bestow upon foam-mesh insulator 1 a deformable quality permitting it to be inserted into a wide range of operational environments as depicted in FIG. 1. Preferably, the surface geometry of the wire(s) forming wire mesh 7 is cylindrical, but such is not a limitation of the present disclosure. In the preferred embodiment, a 0.64516-millimeter diameter, 22 wire gauge with a mesh size opening 9 of 0.5 inch by 0.5 inch weighs 0.49 kilograms per meter squared (kg/m2). This preferred embodiment is not to be construed as a limitation of the current invention as the wires associated with wire mesh 7 weight may range from a 0.91186-millimeter diameter, 19 wire gauge with a mesh size opening 9 of 0.25 inch by 0.25 inch weighing 2.04 kilograms per meter squared (kg/m2) to a 0.7239-millimeter diameter, 21 gauge with a mesh size opening 9 of 2 inch by 2 inch weighing 0.16 kilograms per meter squared (kg/m2).

It is preferable for the wire mesh 7 to define the same or similar shape and/or size as both the first piece of foam 3 and the second piece of foam 5. As depicted in FIG. 1, the foam-mesh insulator 1 is configured (i.e., sized and shaped) to deformably insert into a predetermined opening 10 of a structure. FIG. 1 illustrates the predetermined opening 10 as a basement crawlspace vent, wherein the entire foam-mesh insulator 1 is deformably inserted into the crawlspace vent so that the wire mesh 7 defines a barrier that prevents pests larger than the one or more openings 9 from entering the structure. The first piece of foam 3 and second piece of foam 5 of the dual function, foam-mesh insulator 1 are each preferably black, but may include other colors. Additionally, the first piece of foam 3 and second piece of foam 5 ideally define a rectangular shape, but are not limited to this geometry as they may define other shapes as may be appropriate for their intended use. In the preferred embodiment, the first piece of foam 3 and second piece of foam 5 define substantially planar exterior surfaces (i.e. top, bottom, and side surfaces). It is preferable for the shape and size of the first piece of foam 3 and second piece of foam 5 to be the same as one another, and most preferably to match the size and shape defined by the wire mesh 7. It is also preferable for the first piece of foam 3 and second piece of foam 5 to be of a polymeric material such as polyethylene due to its durability and light weight. However, it should be understood that other natural and synthetic materials, including (but not limited to) other species of open and closed cell foam, latex rubber, ethylene vinyl acetate, neoprene, styrene, memory foam, charcoal foam, rebounded foam, and polyurethane foam(s), and combinations thereof could be utilized.

It is also a preference that the first piece of foam 3 and second piece of foam 5 be made of non-porous material as this specific type of material prevents the entry of substantially all or all air and/or moisture. In the alternative, the first piece of foam 3 and second piece of foam 5 may be of polyurethane, melamine, and other forms of material, however, none are to be construed as a limitation on the type of material used. In the preferred embodiment, the first piece of foam 3 and second piece of foam 5 define a width of one inch, but may vary. The lengths of the first piece of foam 3 and second piece of foam 5 are ideally four inches on the "short" sides of the rectangle and eight inches on the "long" sides, but such is not a limitation of the present disclosure. It is ideal for the first piece of foam 3 and second piece of foam 5 to have dimensions 4"×8"×1" and have a density between one and three pounds.

The ideal assembly process for dual function, foam-mesh insulator 1 is to evenly laminate the first piece of foam 3, second piece of foam 5, and wire mesh 7 together into a single unit. It is also permissible to connect the first piece of foam 3, second piece of foam 5, and wire mesh 7 together through the use of glue and/or other adhesives, or by binding or sonically welding the separate components into one. It should be noted that the previously mentioned methods of combining the separate components is/are not to be construed as a limitation of the present disclosure. The foam-mesh insulator 1 has an ideal width of two inches after laminating the one inch first piece of foam 3, one inch second piece of foam 5, and wire mesh 7 together. Additionally, the ideal shape of the foam mesh 1 is a rectangle, but may vary in shape as may be necessary to fulfill its purpose.

The illustrations and examples provided herein are for explanatory purposes and are not intended to limit the scope of the appended claims.

I claim:

1. A foam mesh insulator for deterring pests comprising:
a first piece of foam formed from a substantially non-porous material and defining a body sized, shaped, and configured to deformably insert into a predetermined opening of a structure to substantially plug the predetermined opening to prevent the entry of heat or moisture from entering a structure; and
a plurality of wires woven together forming a wire mesh having mesh openings and carried by the first piece of foam, the wire mesh defining a wire body sized, shaped, and configured to be positioned in the predetermined opening to prevent pests from accessing the structure by blocking passage of pests larger than the mesh openings, wherein the entire foam mesh insulator is configured to be deformably inserted into the predetermined opening and the foam body and the wire body have a substantially similar exterior periphery.

2. The foam mesh insulator of claim 1, wherein the first piece of foam is formed from polyethylene.

3. The foam mesh insulator of claim 1, wherein the plurality of wires woven together define a wire diameter of at least 22 gauge (0.64516 millimeter) and no more than 19 gauge (0.91186 millimeter).

4. The foam mesh insulator of claim 1, wherein the first piece of foam defines a thickness of one inch.

5. The foam mesh insulator of claim 1, wherein the plurality of wires is formed of one or more metal materials selected from the group consisting of iron, steel, brass, bronze, copper, aluminum, zinc, gold, silver, and platinum.

6. The foam mesh insulator of claim 1, wherein the wire mesh defines one or more untrimmed edge(s).

7. The foam mesh insulator of claim 1, wherein the wire mesh defines one or more balanced edge(s).

8. The foam mesh insulator of claim 1, wherein the plurality of mesh openings is a plurality of square-shaped mesh openings.

9. The foam mesh insulator of claim 8, wherein the plurality of square-shaped mesh openings is a plurality of 4-millimeter by 4-millimeter openings to prevent pests larger than 4 millimeters by 4 millimeters from passing through the plurality of 4-millimeter by 4-millimeter openings.

10. The foam mesh insulator of claim 1 further comprising a second piece of foam defining identical dimensions to the first foam piece, wherein the wire mesh is evenly positioned between the first piece of foam and second piece of foam.

11. The foam mesh insulator of claim 10, wherein the first piece of foam and second piece of foam are both formed from polyethylene.

12. A foam mesh insulator for inhibiting passage of determined pests through a mesh opening, the foam mesh insulator comprising:

a first piece of foam and a second piece of foam, each piece of foam defining a substantially non-porous material body sized, shaped, and configured to deformably insert into a predetermined opening of a structure to substantially plug the predetermined opening to prevent the entry of heat or moisture from entering a structure; and a wire mesh having mesh openings and carried by the first piece of foam, the wire mesh defining a wire body sized, shaped, and configured to be positioned in the predetermined opening to prevent pests from accessing the structure by blocking passage of pests larger than the mesh openings, wherein the wire mesh is evenly positioned between the first piece of foam and second piece of foam;

wherein the entire foam mesh insulator is configured to be deformably inserted into the predetermined opening and the first foam body, second foam body, and the wire body have a substantially similar exterior periphery.

13. The foam mesh insulator of claim 12, wherein the first foam piece and second foam piece are formed of polyethylene.

14. The foam mesh insulator of claim 12, wherein the plurality of wires woven together define a wire diameter of at least 22 gauge (0.64516 mm) and no more than 19 gauge (0.91186 mm).

15. The foam mesh insulator of claim 12, wherein the plurality of wires are formed of one or more metal materials selected from the group consisting of iron, steel, brass, bronze, copper, aluminum, zinc, gold, silver, and platinum.

16. The foam mesh insulator of claim 12, wherein the wire mesh defines one or more untrimmed edge(s).

17. The foam mesh insulator of claim 12, wherein the wire mesh defines one or more balanced edge(s).

18. The foam mesh insulator of claim 12, wherein the plurality of mesh openings defines a plurality of square-shaped mesh openings.

19. The foam mesh insulator of claim 18, wherein the plurality of square-shaped mesh openings is a plurality of 4-millimeter by 4-millimeter openings to inhibit pests larger than 4 millimeters by 4 millimeters from passing through the plurality of 4-millimeter by 4-millimeter openings.

\* \* \* \* \*